United States Patent

[11] 3,590,704

| [72] | Inventor | Hidetomo Endo<br>13-11, Minami-Oi-machi 6 chome,<br>Shinagawa-ku, Tokyo, Japan |
|---|---|---|
| [21] | Appl. No. | 741,153 |
| [22] | Filed | June 19, 1968 |
| [45] | Patented | July 6, 1971 |
| [32] | Priority | June 20, 1967, Sept. 6, 1967 |
| [33] | | Japan |
| [31] | | 42/39,016 and 42/56,759 |

[54] METHOD FOR MEASURING A POSITION OF A SHIP AT SEA
1 Claim, 12 Drawing Figs.

| [52] | U.S. Cl. | 95/1, 33/1 |
|---|---|---|
| [51] | Int. Cl. | G01c 3/00 |
| [50] | Field of Search | 95/1, 15, 16; 33/1 |

[56] References Cited
UNITED STATES PATENTS

| 2,764,073 | 9/1956 | Liu | 95/16 |
|---|---|---|---|
| 2,941,459 | 6/1960 | Fairbanks | 95/15 X |
| 3,046,857 | 7/1962 | Kargl | 95/1.1 |
| 3,162,103 | 12/1964 | Perkins | 95/1 |

*Primary Examiner*—John M. Horan
*Attorney*—George B. Oujevolk

ABSTRACT: A method for measuring a position of a ship at sea by taking picture of observed markings with a wide angle camera provided with a pivoting lens mounted in a bodytube formed with a slit at its forward end and pivoted at the center of the lens and angularly analyzing images of the observed markings formed on the exposed film, so that the position at which the exposure is made and/or the positions at which the observed markings are located can be quickly and accurately calculated and measured.

PATENTED JUL 6 1971

Hidetomo Endo
INVENTOR

George B. Oujevolk
BY
ATTORNEY

METHOD FOR MEASURING A POSITION OF A SHIP AT SEA

BACKGROUND OF THE INVENTION

The present invention relates to a novel and reliable method for measuring a position of a ship at sea by using a wide angle camera provided with a pivoting lens mounted in a bodytube formed with a slit at its forward end and pivoted at the center of the lens.

Measurement for a position of a ship at sea depends essentially on measuring the latitude at which the ship is positioned at the time the observations are made. To this end, a primitive method of making astronomical observations has been employed since olden days. More recently, the sextant was invented at the beginning of the 18th century and has since been commonly used for measuring a position of a ship at sea. However, the conventional method of using a sextant to measure a vertical angle formed by an observed marking in the sky and the horizon with respect to a surveying point is not without disadvantages. For example, there are inevitable errors in the results of observations which are increased by rolling of the ship. Thus, persons who make observations are required to have a great deal of skill which can be attained only by long years of training and practice, in order to minimize errors in the results of observations. Moreover, making observations is impossible when the sea is rough however skilled the observer may be.

In cases where an angle $\theta_1$ by observed markings $a$ and $b$ in FIG. 2 on land and an angle $\theta_2$ formed by observed markings $b$ and $c$ in FIG. 2 on land with respect to a moving surveying ship at sea are measured separately with sextant, errors attributed to movement of the position of the ship which may vary depending on the speed of the ship and the length of time elapsing between two separate observations may add to errors which are naturally made by the observer in making observations, with the result that the results of observations may become inaccurate and unreliable. A submarine topographical map prepared based on the results of observations made in this way leaves much to be desired in accuracy and dependability.

Rapid strides taken by science in the field of radio communication and navigation in modern times have made it possible to directly measure the distance by using radio beacon, loran, talemeter, sonar or the like. Radio navigation offers a reliable method of fixing a position of a ship at sea, but the equipment required is costly.

The present invention has as its object the provision of a novel, reliable and economical method for measuring a position of a ship at sea by using a wide angle camera provided with a pivoting lens mounted in a bodytube formed with a slit at its forward end and pivoted at the center of the lens to take pictures of observed markings on land and/or in the sky and angularly analyzing the results of the observations.

According to the invention, there is provided a method for measuring a position of a ship at sea which comprises the steps of taking a picture with the side angle camera described above of three observed markings when the direction of pivotal movement of the lens is oriented substantially horizontally and two observed markings when the direction of pivotal movement of the lens is oriented substantially vertically, measuring an angle or angles formed by the observed markings with respect to the surveying ship by using a scale graduated in angles expressed in terms of lengths on an arc corresponding to the locus of the focal point of the pivoting lens or by using a measurescope, and plotting the results or using a computer for fixing the surveying point or the position of the ship at the time of survey.

An object of this invention is to provide a method for measuring a position of a ship in an instance and hence to increase the speed of depth surveying ships used for preparing marine charts. This permits carrying out of a survey operation continuously and minimize the cost and labor involved in carrying out such a survey.

BRIEF EXPLANATION OF THE DRAWINGS

The accompanying drawings show preferred embodiments in which the method embodying this invention can be carried into practice in different applications.

DETAILED DESCRIPTION OF THE INVENTION

Figure 1:
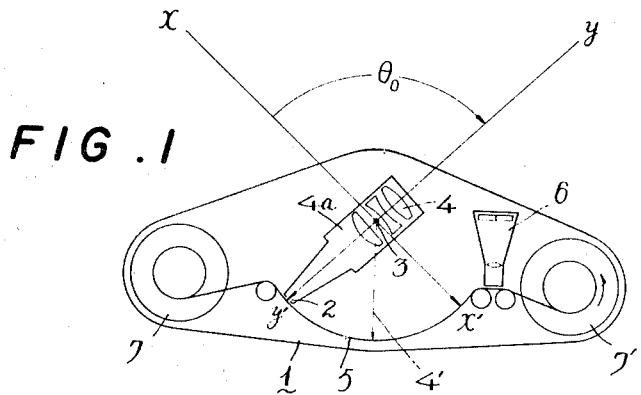
FIG. 1 is a schematic plan view of a wide angle camera used for taking pictures in the method according to this invention.

Referring to FIG. 1 the wide angle camera 1 comprises a pivoting lens 4 mounted in a bodytube 4$a$ formed with a slit 2 at its forward end and pivoted at the center 3 of the lens 4; a sensitive film 5 disposed on an image forming surface or an arc corresponding to the locus of the focal point 4' of the pivoting lens 4; and an attachment 6 for recording exposure number and exposure time in one portion of the sensitive film 5. The bodytube 4$a$ which mounts therein the pivoting lens 4 is normally oriented in the direction Y as shown and is moved in pivotal motion so as to be oriented in the direction X only when a shutter (not shown) is set.

When the shutter is set, the sensitive film 5 in a magazine 7 is advanced by one frame toward a magazine 7'.

Upon pushing a shutter button with the camera in the condition as described above, the shutter built in the bodytube 4$a$ is opened and the bodytube 4$a$ is moved in pivotal motion in the direction X to a position in which it is oriented in the direction Y through a picture taking angle, thereby completing exposure of the film.

The sensitive film 5 is thus exposed to form thereon an image of a subject field corresponding to a picture taking angle (120° to 140°) of the bodytube 4$a$ by scanning of the lens 4 through the slit 2. Formed on the exposed film is a film frame 5' which corresponds in length to the range of exposure X' to Y'.

The film frame 5' thus exposed is developed, and an angle or angles formed by the observed markings with respect to the surveying point are measured by using an angle measuring scale prepared beforehand or directly printed on the film or by using a measurescope when it is required to make precise measurements.

Figure 5:
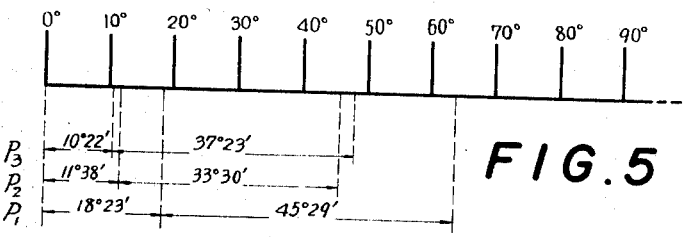
FIG. 5 is a view showing an angle measuring scale for measuring angles formed by images of the observed markings on the exposed film with respect to the camera and the manner in which measurements are made.

The angle measuring scale shown in FIG. 5 is graduated in angles proportional to the focal length of the lens and expressed in terms of lengths on an arc corresponding to the locus of the focal point of the lens. When the camera is used for taking pictures of the sun, a filter may be used which has a curved surface similar in curvature to the locus of the focal point of the pivoting lens. Support means may be used for supporting the camera firmly in such a manner that when observed markings are disposed in side-by-side relation substantially horizontally the direction of pivotal movement of the lens can be oriented substantially horizontally, and when observed markings are disposed one above another substantially vertically the direction of pivotal movement of the lens can be oriented substantially horizontally.

The method of carrying out a survey according to this invention will now be explained. The exposed film 5 shown in FIG. 3 has in a frame 5' thereof images $a'$, $b'$ and $c'$ of observed markings $a$, $b$ and $c$ on land formed by photographing at a surveying point P shown in FIG. 2. The frame 5' also has on its surface recordings of a number 6' and a timer 6" representing an identifying number and the time of exposure recorded by the recording attachments 6 of the wide angle camera 1. This aids in associating the results obtained in determining a position of a ship with the results obtained by using a depthmeter or the like.

Figure 4:
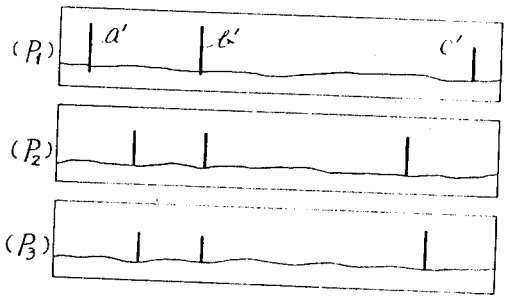
FIG. 4(I) and 4(II) show the method embodying this invention for measuring a position of a ship at sea by taking pictures of the same observed markings at different surveying points.
Figure 4I:
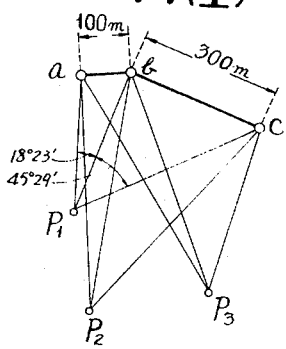

FIG. 4(II) shows images $a'$, $b'$ and $c'$ of the observed markings $a$, $b$ and $c$ respectively formed in different frames of the film by taking pictures of the observed markings at different surveying points $P_1$, $P_2$ and $P_3$. Angles formed by the images $a'$ and $b'$ and $b'$ and $c'$ of observed markings respectively with respect to a particular surveying point are measured with angle measuring scale or measurescope, and the results obtained are plotted by using a triple-lever protractor or calculated to measure a particular position of the ship.

Figure 2:
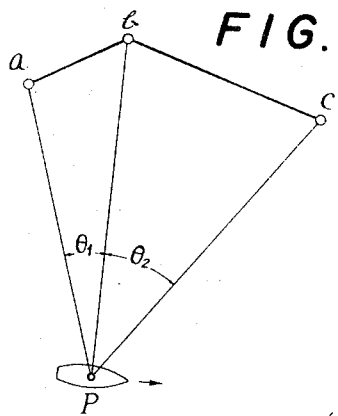
FIG. 2 is a schematic view of the method embodying this invention for measuring a position of a ship at sea.
Figure 3:
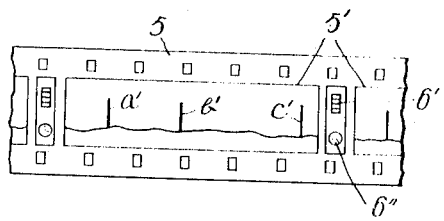
FIG. 3 is a developmental view of film on which images of the observed markings are formed.

If coordinate values are given to the surveyed markings $a$, $b$ and $c$ as shown in FIG. 2, the position of the surveying point P can be determined by obtaining the coordinate value of P from simultaneous equations of the two sides having these coordinate values and the angles $\Theta_1$ and $\Theta_2$. Also, the positions of a number of surveying points $P_1$, $P_2$, $P_3$...Ph can be determined by feeding information on angles $\Theta_1$...$\Theta$n on to a computer.

Figure 6:
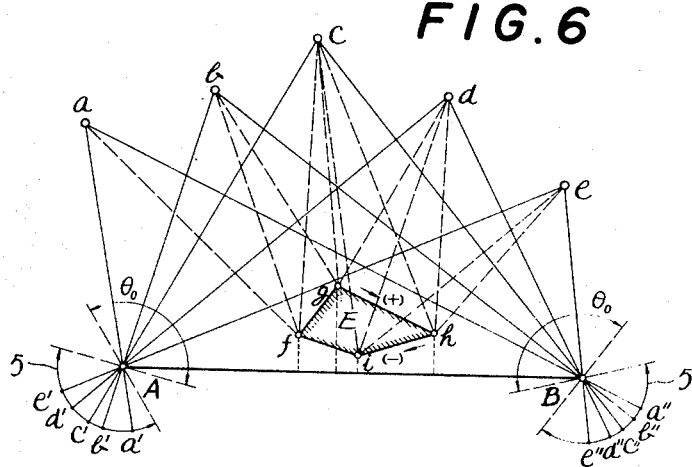
FIG. 6 shows the method embodying this invention of carrying out a survey of an area on the sea.

FIG. 6 shows the method of survey embodying the present invention as applied to the surveying of an area on the sea. In this application, the wide angle camera described previously is used for taking pictures of observed markings $a$, $b$, $c$, $d$, $e$...with points A and B on the base line AB as a base. The positions of the observed markings $a$, $b$, $c$, $d$, $e$...can be determined by using the points A and B as a base from angles formed by images $a'$ and $b'$, $b'$ and $c'$, $c'$ and $d'$, $d'$ and...of the observed markings with respect to the point A and angles formed by images $a''$ and $b''$, $b''$ and $c''$, $c''$ and $d''$, $d''$ and $e''$, $e''$...of the observed markings with respect to the point B. Then, coordinate values are given to the points A and B, and the coordinate values of the observed markings $a$, $b$, $c$, $d$, $e$...are calculated from the coordinate values of the points A and B. Pictures of the observed markings $a$, $b$, $c$, $d$, $e$..., the values of which are already known, are then taken at points $f$, $g$, $h$ and $i$, for example, which are disposed on corners of the area to be surveyed. By calculating the coordinate values of $f$, $g$, $h$ and $i$, it is possible to determine the size of the area E surrounded by sides $fg$, $gh$, $hi$ and $if$ without having recourse to other surveying method, such as plane-table surveying or the like. An added advantage of the surveying method provided by this invention lies in the fact that by preserving the film exposed in taking pictures of observed markings, it is possible to perpetuate the integrity of boundary lines. Thus, the surveying method according to this invention can have application in fixing boundaries not only on the sea but also on land.

Figure 7I:
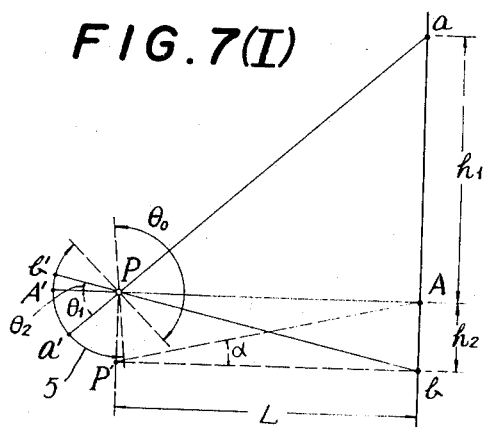
FIGS. 7(I) and 7(II) are views in explanation of the manner in which pictures of observed markings disposed one above another substantially vertically are taken by the method embodying this invention.
Figure 7:
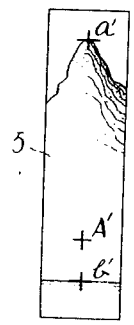

FIG. 7 shows the method of survey according to this invention as applied to the measuring of the height of a mountain with respect to the water level. In this application, the wide angle camera is supported such that the axis of pivotal movement of the lens is oriented substantially horizontally. A target A is set on an extension of the level line of bodytube mounting the pivoting lens of the camera supported at a point P on land, and a picture is taken of the subject field including the summit $a$ of the mountain, the target A and a point $b$ on the water level. If the distance L between the points P and A is known, the heights $h_1$ and $h_2$ can be measured from an angle $\Theta_1$ formed by images the surveyed markings A' and $a'$ on the exposed film and an angle $\Theta_2$ formed by images of the observed markings A' and $b'$ on the exposed film with respect to the surveying point P.

Alternatively, if the values of heights $h_1$ and $h_2$ are known, the distance L between the points P and A can be measured.

From the foregoing, it will be understood that the surveying method embodying this invention can have application in determining changes in seal level caused by the ebb and flow of the tide by making observations on a surveying ship. More specifically, a picture of a target A on land which is used as a bench-mark and a point b on the sea level is taken at a surveying spot P' at sea, and the height $h_2$ of the target A above the sea level is determined from the value $\alpha$ of an angle formed by the target A and the point $b$ on the sea level with respect to the surveying point P'. It is thus possible to measure the height of the tide at the time of survey while making observations on board a ship.

Figure 8:
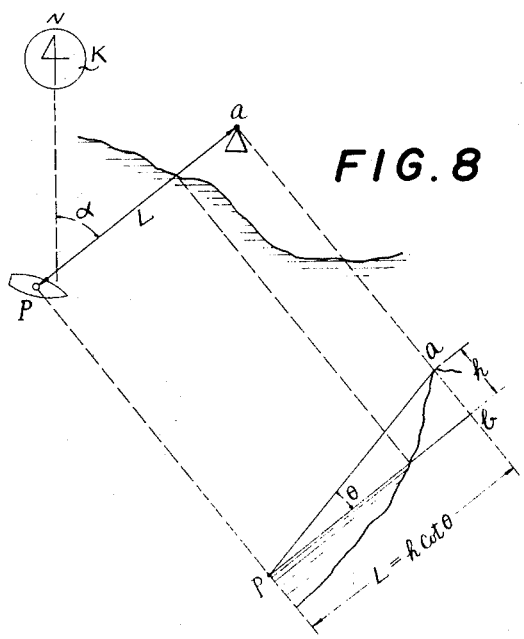
FIG. 8 shows the method embodying this invention for measuring a position of a ship at sea by taking pictures of observed markings on land in marine survey.

FIG. 8 shows the method of survey embodying this invention as applied to the measurement for a position of a ship at sea by taking a picture of an observed marking $a$ (a mountain summit or the top of a tall building, such as a tower or the like) and a point $b$ on the sea level. Picture taking is carried out by positioning the wide angle camera in such a manner that the direction of pivotal movement of the lens is oriented substantially vertically, and the value $\Theta$ of an angle formed by the observed markings $a$ and $b$ with respect to the surveying point P is obtained. At the same time, the azimuth $\alpha$ of the surveying ship is measured with a compass K on board the ship and the results obtained are plotted to measure the position of the ship at the time of survey.

When observations are to be made at night or under conditions wherein it is impossible to take pictures of observed markings, a picture may be taken of a light source, such as a device mounted at an elevated position for producing artificial light beams intersecting each other or a device for generating powerful artificial light beams in the form of poles, by using the camera described previously. Images of such light beams formed on the exposed film can be used for measuring a particular position of a ship.

Figure 9I:
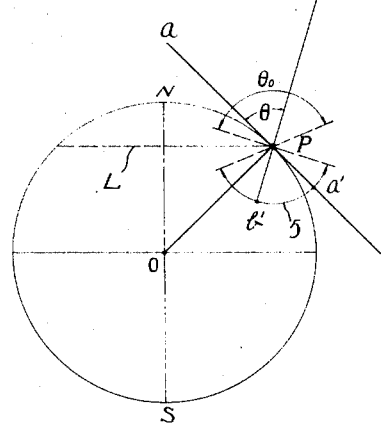
FIGS. 9(I) and 9(II) show the method embodying this invention as applied to the measurement for the latitude at which the ship is positioned by taking pictures of observed markings disposed one above another substantially vertically.
Figure 9:
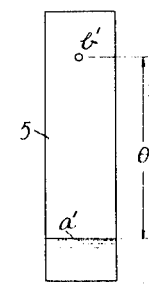

FIG. 9 shows the method of survey embodying this invention as applied to the measurement for a position of a ship sailing the ocean. When the ship is positioned at a surveying point P in the ocean, a line P $a$ which is normal to the axis of the earth is a horizontal line. It will be evident that the latitude of the surveying point P at which the ship is positioned can be determined based on the value $\Theta$ of an angle formed by a point $a$ on the horizontal line and the sun $b$ (at the 12 noon position, for example) with respect to the surveying point P, if a picture of the point $a$ and the sun $b$ is taken at the surveying point P with the wide angle camera disposed in such a manner that the direction of pivotal movement of the lens is oriented substantially vertically.

While the invention has been described hereinabove with reference to embodiments thereof in which the surveying method according to this invention is used for measuring a position of a surveying point in carrying out various survey operations in the ocean or a position of a ship at sea, it is to be understood that the invention is not limited to the particular forms of the embodiments and that the method of this invention can also be employed with satisfactory results in carrying out a survey on land.

What I claim is:

1. A method of measuring a position or fix of a vessel or the like comprising the steps of:
   a. taking a single frame photograph of three known reference points from said vessel by swinging a camera lens tube through an angle of movement sufficient to encompass said three points;
   b. simultaneously applying time reference indicia on the photographic film;
   c. developing said film;
   d. measuring directly on said film the distance between the reference points on a scale calibrated in degrees to indicate the angle from the vessel to said reference points; and
   e. trigonometrically calculating the position of said vessel from the known values.